US012388887B2

(12) United States Patent
Lyons

(10) Patent No.: US 12,388,887 B2
(45) Date of Patent: *Aug. 12, 2025

(54) DISTRIBUTING COMPRESSED VIDEO FRAMES IN A VIDEO CONFERENCE

(71) Applicant: Zoom Video Communications, Inc., San Jose, CA (US)

(72) Inventor: Karan Lyons, Los Angeles, CA (US)

(73) Assignee: Zoom Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/732,721

(22) Filed: Jun. 4, 2024

(65) Prior Publication Data
US 2024/0323246 A1 Sep. 26, 2024

Related U.S. Application Data

(63) Continuation of application No. 18/110,775, filed on Feb. 16, 2023, now Pat. No. 12,021,912, which is a
(Continued)

(51) Int. Cl.
H04L 65/70 (2022.01)
H04L 12/18 (2006.01)
H04N 19/44 (2014.01)

(52) U.S. Cl.
CPC .......... H04L 65/70 (2022.05); H04L 12/1818 (2013.01); H04L 12/1831 (2013.01); H04N 19/44 (2014.11)

(58) Field of Classification Search
CPC ............... H04L 65/607; H04L 12/1818; H04L 12/1831; H04N 19/44
See application file for complete search history.

(56) References Cited

U.S. PATENT DOCUMENTS 9,232,244 B2 * 1/2016 Chen .................... H04N 19/107
11,368,510 B1 6/2022 Lyons
(Continued)

FOREIGN PATENT DOCUMENTS

KR 20090019825 2/2009
TW 1571113 2/2017

OTHER PUBLICATIONS

17/246, 191 , "Notice of Allowance", Feb. 23, 2022, 11 pages.
(Continued)

Primary Examiner — Jonathan A Bui
(74) Attorney, Agent, or Firm — Kilpatrick Townsend & Stockton, LLP

(57) ABSTRACT

One disclosed example method includes receiving, by a video conference provider, video frames from a plurality of existing participants in a video conference; receiving, by the video conference provider, a request from a new user to join the video conference, and in response: generating, by the video conference provider, an instantaneous decoder refresh (IDR) frame; determining, by the video conference provider, one or more prior video frames previously acknowledged by each existing participant of the plurality of existing participants; generating, by the video conference provider, a benchmark frame for each of the plurality of existing participants based on at least one of the determined one or more prior video frames and the IDR frame; transmitting, by the video conference provider, the IDR frame to the new user; and transmitting, by the video conference provider, a message comprising the benchmark frame to each of the plurality of existing participants.

20 Claims, 6 Drawing Sheets

Related U.S. Application Data continuation of application No. 17/833,443, filed on Jun. 6, 2022, now Pat. No. 11,606,405, which is a continuation of application No. 17/246,191, filed on Apr. 30, 2021, now Pat. No. 11,368,510.

(56) References Cited

U.S. PATENT DOCUMENTS

| | | | |
|---|---|---|---|
| 11,606,405 | B2 | 3/2023 | Lyons |
| 12,021,912 | B2 | 6/2024 | Lyons |
| 2007/0206673 | A1* | 9/2007 | Cipolli ............... H04N 19/573 375/240.1 |
| 2009/0251528 | A1* | 10/2009 | Friel ............... H04N 21/23424 348/14.08 |
| 2013/0166650 | A1* | 6/2013 | Chen ................ H04N 19/164 709/204 |
| 2013/0286156 | A1 | 10/2013 | Golas |
| 2015/0009930 | A1* | 1/2015 | Rapaport ............ H04W 72/542 370/329 |
| 2018/0278669 | A1* | 9/2018 | Davies ................. H04L 65/70 |
| 2022/0060767 | A1 | 2/2022 | Reznic |

OTHER PUBLICATIONS

U.S. Appl. No. 17/833,443, "Notice of Allowance", Oct. 26, 2022, 13 pages.

U.S. Appl. No. 18/110,775, "Non-Final Office Action", Jul. 19, 2023, 7 pages.

U.S. Appl. No. 18/110,775, "Notice of Allowance", Feb. 28, 2024, 7 pages.

Bulla et al., "Region of Interest Encoding in Video Conference Systems", The Fifth International Conferences on Advances in Multimedia (MMEDIA), Jan. 2013, pp. 119-124.

PCT/US2022/024736, "International Preliminary Report on Patentability", Nov. 9, 2023, 10 pages.

PCT/US2022/024736, "International Search Report and Written Opinion", Jul. 29, 2022, 15 pages.

Sjoberg et al., "JCTVC-S0095: HLS: Dependent Rap Indication SEI Message", Ericsson, Apr. 26, 2019, pp. 1-15.

Sychev et al., "HLS: On Redundant Pictures SEI message for HEVC", Document: JCTVC-S0196, Oct. 17-24, 2014, pp. 1-9.

* cited by examiner

DISTRIBUTING COMPRESSED VIDEO FRAMES IN A VIDEO CONFERENCE

CROSS-REFERENCE

This application is a continuation of U.S. patent application Ser. No. 18/110,775, filed Feb. 16, 2023, titled "Distributing Compressed Video Frames in a Video Conference," which is a continuation of U.S. patent application Ser. No. 17/833,443, filed Jun. 6, 2022, now U.S. Pat. No. 11,606,405 titled "Receiving Compressed Video Frames in a Video Conference," which is a continuation of U.S. patent application Ser. No. 17/246,191, filed Apr. 30, 2021, now U.S. Pat. No. 11,368,510, titled "Video Frame Generation," the entirety of all of which are hereby incorporated by reference.

FIELD

The present application generally relates to hosting or participating in video conferences and more particularly relates to systems and methods for video frame generation during video conferences.

BACKGROUND

Videoconferencing has become a common way for people to meet as a group, but without being at the same physical location. Participants can be invited to a video conference meeting, join from their personal computers or telephones, and are able to see and hear each other, conversing largely as they would during an in-person group meeting or event. The advent of user-friendly video conferencing software has enabled teams to work collaboratively, despite being dispersed around the country or the world. It has also enabled families and friends to engage with each other in meaningful ways, despite being physically distant from each other.

SUMMARY

Various examples are described for systems and methods for video frame generation during video conferences. One example method includes receiving, by a video conference provider, video frames from a plurality of existing participants in a video conference; receiving, by the video conference provider, a request from a new user to join the video conference, and in response to the request from the new user: generating, by the video conference provider, an instantaneous decoder refresh (IDR) frame; determining, by the video conference provider, one or more prior video frames previously acknowledged by each existing participant of the plurality of existing participants; generating, by the video conference provider, a benchmark frame for each of the plurality of existing participants based on at least one of the determined one or more prior video frames and the IDR frame; transmitting, by the video conference provider, the IDR frame to the new user; and transmitting, by the video conference provider, a message comprising the benchmark frame to each of the plurality of existing participants.

One example system includes a non-transitory computer-readable medium; and a processor in communication with the non-transitory computer-readable medium, the processor configured to execute instructions stored in the non-transitory computer-readable medium to receive video frames from a plurality of existing participants in a video conference; receive a request from a new user to join the video conference, and in response to the request from the new user: generate an IDR frame; determine one or more prior video frames previously acknowledged by each existing participant of the plurality of existing participants; generate a benchmark frame for each of the plurality of existing participants based on at least one of the determined one or more prior video frames and the IDR frame; transmit the IDR frame to the new user; and transmit the benchmark frame to each of the plurality of existing participants.

One example non-transitory computer-readable medium includes processor-executable instructions configured to cause a processor to receive video frames from a plurality of existing participants in a video conference; receive a request from a new user to join the video conference, and in response to the request from the new user: generate an IDR frame; determine one or more prior video frames previously acknowledged by each existing participant of the plurality of existing participants; generate a benchmark frame for each of the plurality of existing participants based on at least one of the determined one or more prior video frames and the IDR frame; transmit the IDR frame to the new user; and transmit the benchmark frame to each of the plurality of existing participants.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
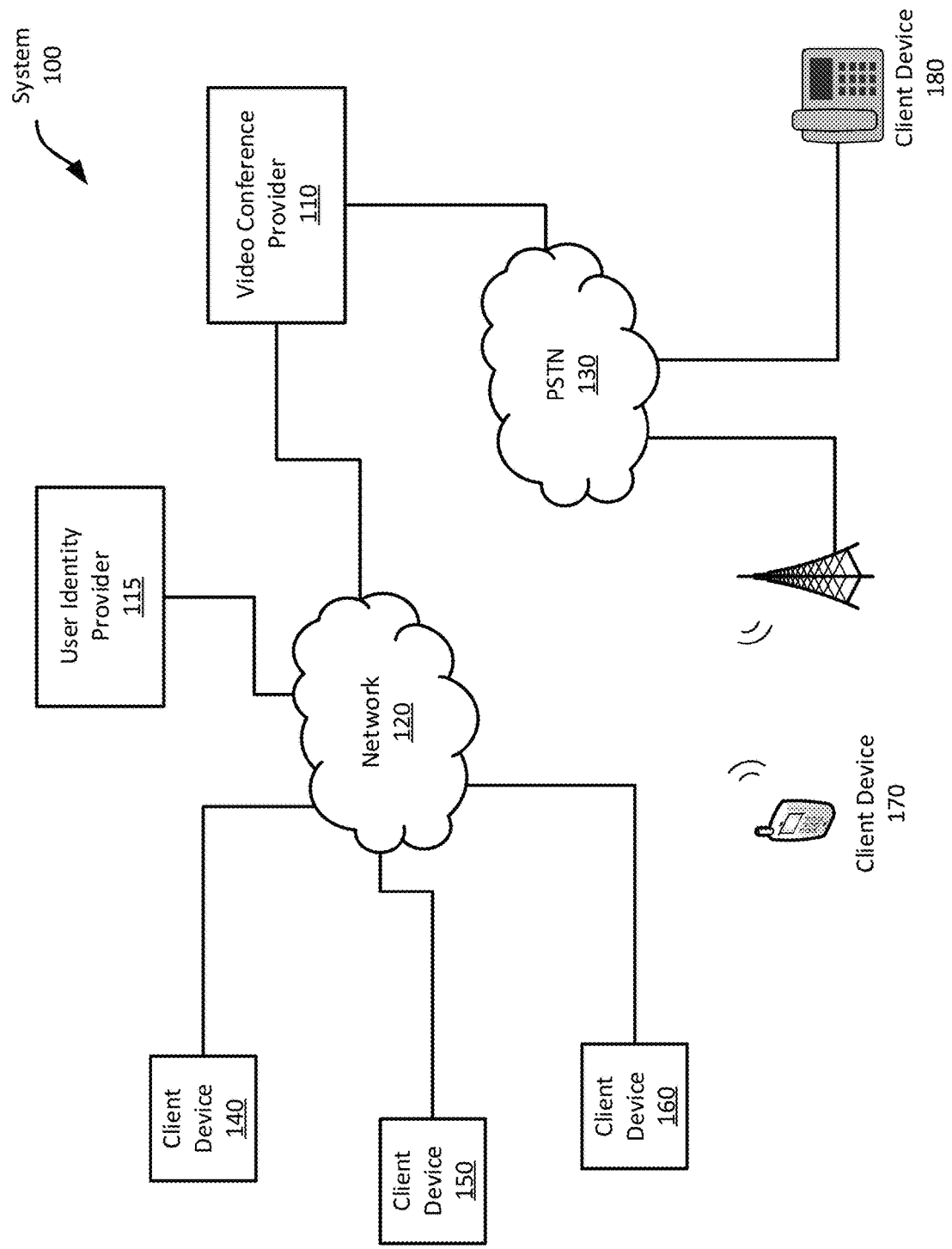
FIGS. 1-4 shows example systems for video frame generation during video conferences.

Examples are described herein in the context of systems and methods for video frame generation during video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may join the video conference at different points in time. This can be done using audio and video that is streamed between participants to a video conference, which may include a transmission or re-transmission of large amounts of data associated with the streaming audio and video. For example, when a new participant joins an on-going video conference, a video conference provider may request a transmission (or re-transmission) of streaming audio and video, which can then be used to add the new participant. To reduce bandwidth consumption during the video conference, only differential frame information is sent to the participants most of the time. But new participants cannot use differential frame information because they do not have any initial frame information. But sending that initial frame to everyone would require a transmitting a lot of data, which may strain available network resources, causing participants to incur high bandwidth costs.

For example, a group of four friends may want to have a video conference to catch up. One friend may send a meeting invitation, for example, in a group message that includes a scheduled time and date to meet (e.g., via a link to a website that is associated with the video conference provider). At the scheduled date and time the friend may begin hosting the video conference by accessing the link. Shortly thereafter, two of the three remaining friends may join the video conference. However, the fourth friend may be running late, and may request to join the ongoing conference 10 minutes after the host has initiated it.

In order to add the fourth friend, as a new participant to the video conference, the video conference provider needs to send full frames of video from each of the three friends to the new friend, which incurs a necessary bandwidth cost to allow the new friend's client device to get caught up. Because the video conference provider employs differential frames during the video conference to reduce bandwidth consumption, it needs to ensure that all participants receiving differential frames are working from a common baseline. But sending these new frames of video to all existing participants would incur a significant bandwidth cost.

To avoid this issue, while ensuring video quality going forward, in addition to sending full new frames of data to the newly joined friend, the video conference provider checks its records regarding previously sent video frames that all the previously attending friends have successfully received—their client devices acknowledge each successfully received frame. After identifying one or more prior frames, the video conference provider generates a new differential frame (for each video feed) that encodes the differences between these prior frames and the new frames sent to the newly joined friend. Thus, the newly joined friend receives a full frame, while the previously joined friends receive the differential frame that will generate an identical frame to the one sent to the newly joined frame.

At this time, all four friends have received and generated identical video frames, and so are in sync with each other. The video conference provider takes advantage of this by also including in the differential frame sent to the previously joined participants an indication to use the newly generated frame as the new basis for any subsequent differential frames. Thus, going forward, the video conference provider can send the same differential frame to all users and be ensured that each is starting from the same full frame of video.

By employing such a technique, the video conference provider is able to avoid sending a new full frame of video to every participant in the video conference, but is still able to ensure that all participants are starting from the same benchmark for subsequent frame transmission. This can significantly reduce bandwidth usage when new participants join an on-going video conference while ensuring that the video conference provider is able to use the same benchmark frame for future differential frames for all participants.

This illustrative example is given to introduce the reader to the general subject matter discussed herein and the disclosure is not limited to this example. The following sections describe various additional non-limiting examples and examples of systems and methods for video frame generation during video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network (e.g., the Internet) so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers (e.g., user identity provider 115), which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
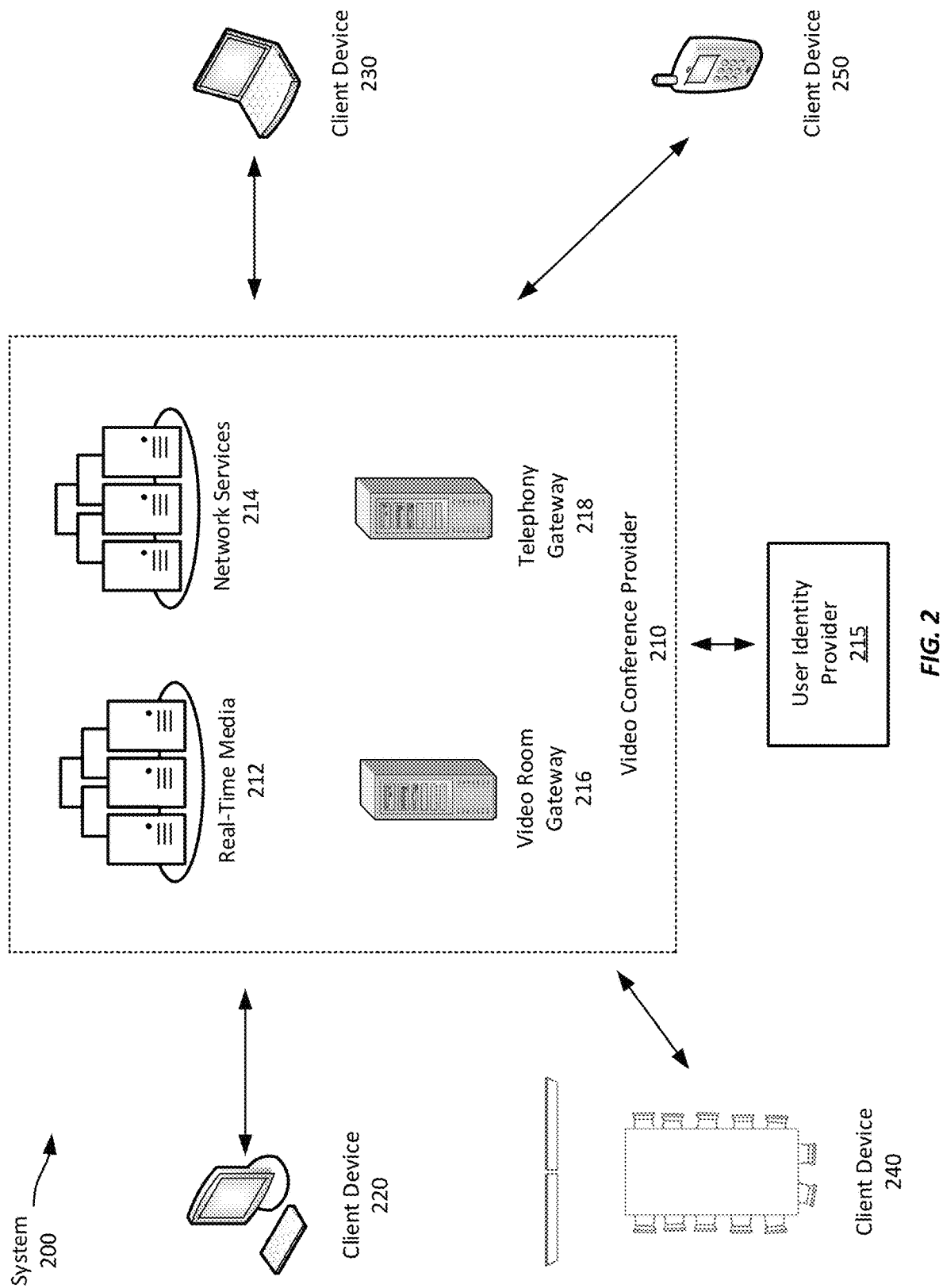

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, for example, to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network (PSTN) 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the Internet or other suitable computer network. Suitable networks include the Internet, any local area network (LAN), metro area network (MAN), wide area network (WAN), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), Internet Protocol (IP) phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls (e.g., using a headset and microphone). Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device (e.g., client devices 140-160), may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, such as client devices 170-180, the user may place a telephone call to the video conference provider 110 to access video conference services. After the call is answered, the user may provide information regarding a video conference meeting (e.g., a meeting identifier (ID)), a passcode or password, etc., to allow the telephony device to join the meeting and participate using audio devices of the telephony device (e.g., microphone(s) and speaker(s)), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information (e.g., a meeting ID and passcode), but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the Internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among User Datagram Protocol (UDP), Transmission Control Protocol (TCP), Transport Layer Security (TLS), or Hypertext Transfer Protocol Secure (HTTPS) for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities (e.g., client device 250), the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), such as cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises (e.g., at a business or another organization). For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure (e.g., Internet backbone network(s)), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, for example, for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user (e.g., a username and password or single sign-on credentials) to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, for example, by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, for example, by sending dual-tone multi-frequency (DTMF) audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device (e.g., a microphone and speaker) for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
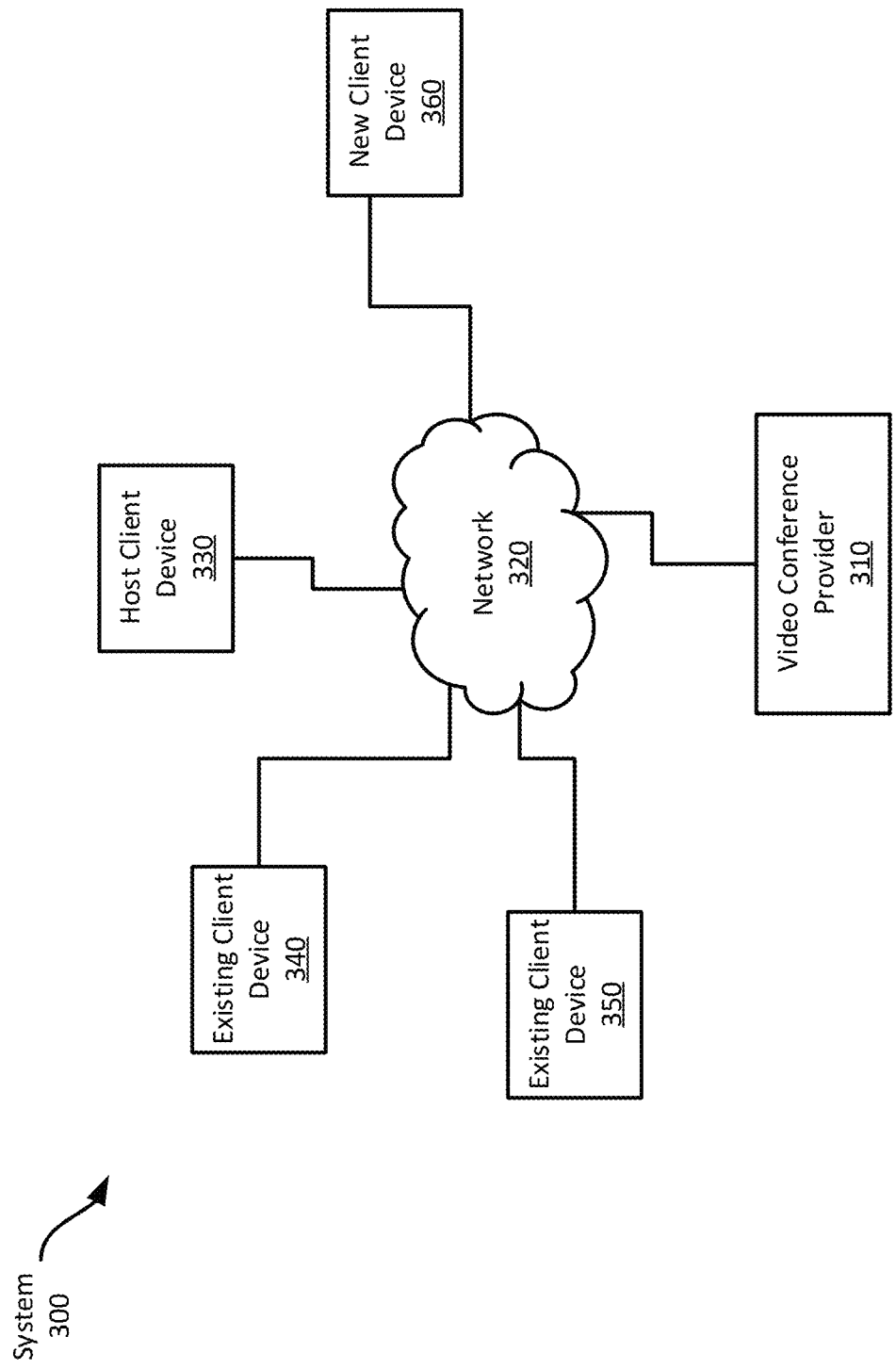

Referring now to FIG. 3, FIG. 3 illustrates a simplified system 300 for video frame generation that enables users to engage in a video conference. The system includes a host client device 330, two existing client devices 340, 350, a new client device 360, and a video conference provider 310. The client devices 330-360 are connected to video conference provider 310 through one or more communication networks 320, generally as described above with respect to FIGS. 1 and 2.

In system 300, shown in FIG. 3, the host client device 330 initially connects to the video conference provider 310 and requests the creation of a new meeting. In some examples, the video conference provider 310 may act as a centralized processing hub that performs various video processing tasks described herein. But in other examples, the video conference provider 310 may not actively process audio and video data, rather the video conference provider 310 may distribute the audio and video data to be processed locally (e.g., at client devices 330-360). For example, each of the client devices 330-360 may be capable of sending information to the video conference provider 310, and in turn, the video conference provider 310 can relay (e.g., broadcast) that information to the other client devices 330-360. Thus, the video conference provider 310 may act as either a centralized processing hub or a relay server. Further, in some examples, one or more of the client devices 330-360 may be configured to act as a video conference provider 310 (e.g., in a peer-to-peer (P2P) network configuration.

Once the meeting is created, host client device 330 is designated as the host of the meeting by the video conference provider 310. Participants join the video conference using their respective existing client device 340, 350, each of which are in communication with one another and are capable of sending and receiving audio and video streams. Each of the participants can also communicate with other respective participants, for example, using public keys that are published or distributed in any suitable manner, such as by registering the keys with a trusted entity or by generating and verifying cryptographic signatures.

During the video conference, video conference provider 310 receives video frames from existing participants (e.g., from host client device 330 and existing client devices 340, 350). In some examples, the video frames from existing participants may vary in size. For instance, video frames from the host client device 330 may include high definition (HD), 4K, or 8K video frames, while video frames from the host client device 330 may include standard definition (SD) video frames. In addition, bandwidth consumption among the existing participants may fluctuate during the video conference, for example, as a resolution may change in response to the a change in which participant is speaking and/or is designated as the host. To mitigate an amount of bandwidth that is required to transmit streaming audio and video, the video conference provider 310 can leverage differential frame information from the existing participants during the video conference, which is described in greater detail below.

In video coding, a group of pictures is a structure of successive pictures that typically includes an intra-coded frame (I-frame), predicted frame (P-frame), and bi-directional predicted frame (B-frame). Generally, I-frames are full frames that include all the data that is needed for display, which are typically larger in size because they are self-contained. P-frames are delta frames that reference previous frames of data that allow a frame of video to be generated based on the prior frame(s) and the delta information carried in the P-frame. Thus, P-frames are significantly smaller in size than I-frames because they only need to encode changes between frames of video, not the full frame itself. Another type of delta frame that is used in some settings are B-frames. While B-frames are also small in size, they reference future frames (e.g., in a previously-recorded video) and, therefore, are not useful for live, streaming videos.

In this example, the video conference provider 310 receives a request from new client device 360 to join the video conference. In response, the video conference provider 310 generates an instantaneous decoder refresh (IDR) frame for each of the video streams received from the existing participants and transmits each of these IDR frames to the new client device 360. IDR frames are I-frames that include instructions that are provided to a decoder to indicate that no new frames will reference further back that the respective IDR frame. Thus, the IDR frame "resets" a computation of any successive delta frames so that they will only reference the IDR frame or successive frames. The video conference provider 310 may periodically output IDR frames to client devices 330-350 to keep the live audio and video in lockstep at the various recipient client devices by periodically resetting the start point for delta frames.

In particular, a difficulty with delta frames is that, if a client has not received a reference frame (e.g., an IDR frame) that is needed to help compute a current frame based on a received delta frame (e.g., where some needed information is missing), then undesirable visual effects may be created. These undesirable visual effects are commonly referred to as datamoshing, which may include an appearance of a picture "melting," the occurrence of green blocks in the video, pixelation, or other image distortions. In some examples, datamoshing effects can result from dropped frames, packet loss, or bandwidth constraints (e.g., for cellular users of client devices 430-450 that are connected via a 3G, 4G LTE, or 5G network with inconsistent coverage), etc. Further, these datamoshing effects can be compounded in a multi-receiver environment, for example, during a video conference between client devices 330-350.

This is because any one of the client devices 330-350 can fail to receive any frame from the video conference provider 310.

To prevent datamoshing effects, the video conference provider 310 can generate IDR frames for the existing participants using frames received from each of the client devices 330-350. In one example, the video conference provider 310 receives an acknowledgement message from each client device 330-350, acknowledging the frames that the client devices 330-350 have received. The video conference provider 310 determines one or more frames that all of the client devices 330-350 has received using the acknowledgement messages. And based on these determined one or more frames that all of the client devices 330-350 have received, the video conference provider 310 sends P-frames to each of the client devices 330-350. As a result, the video conference provider 310 only generates P-frames using frames that all clients have acknowledged receiving, and all of the client devices 330-350 will generate the same video frames at any given time, thereby maintaining an integrity of the streaming audio and video that shared amongst the existing participants. If a new participant joins, however, they will not have any prior frames and so they will need a full video frame (e.g., an I-frame or an IDR frame).

And while in this example, the video conference provider 310 receives acknowledgements from the client devices 330-350, in some examples, the client devices 330-350 may receive such acknowledgements instead. For example, as discussed above, the video conference provider 310 may not process any video or audio streams relayed during the video conference. For example, clients 330-350 may encrypt their video and audio streams using cryptographic keys that are not available to the video conference provider 310. While the video conference provider 310 can distribute the video and audio feeds, it cannot perform the frame-level processing above. Thus, the client devices 330-350 themselves receive acknowledgements from the other client devices and use those acknowledgments to generate IDR frames and benchmark frames as discussed within this disclosure.

Returning to the example shown in FIG. 3, the video conference provider 310 also receives video frames from the existing participants (e.g., via host client device 330 and existing client devices 340, 350) during the video conference. The video conference provider 310 provides video information corresponding to the received video frames to the client devices 330-350, which allows each of them to view streaming audio and video from the other participants. For example, the video conference provider 310 may receive I-frames or P-frames from one or more of the client devices 330-350. In this example, the video conference provider 310 identifies a prior video frame that was previously acknowledged by each of existing participant's client devices 330-350.

For instance, during the video conference, the video conference provider 310 facilitates the streaming of the live audio and video by sending video frames it receives from one participant to the other participants. In one example, the video conference provider 310 receives a video frame from the host client device 330 during the conference, and in turn, the video conference provider 310 sends that video frame to existing client devices 340, 350. In response to receiving the video frame from the video conference provider 310, each of the existing client devices 340, 350 may send an acknowledgement message (e.g., an "ACK") that the video frame was receive. Alternative, if the existing client devices 340, 350 do not receive the video frame, they may send a negative acknowledgement message (e.g., an "NACK"). In some examples, the video conference provider 310 uses video frame information (e.g., timestamps) to track which video frames have been received amongst the participant's client devices 330-350.

The video conference provider 310 generates a benchmark frame using previously-acknowledged, prior video frames. A benchmark frame refers to a differential frame (e.g., a P-frame) that includes additional video frame information that causes the benchmark frame to be treated as an IDR frame. Like IDR frames, benchmark frames include instructions that are provided to a decoder to indicate that no new frames will reference further back than the respective benchmark frame. In one example, the respective benchmark frames may be derived from previously-acknowledged, prior video frames from each of the existing participants. In some examples, the benchmark frame may be a single benchmark frame that is duplicated and transmitted to each of the existing participants. For instance, the benchmark frame may be generated based on one or more previously-acknowledged, prior video frames that all of the participants acknowledged receiving. The video conference provider 310 transmits a message to each of the existing participants that includes the benchmark frame. In some examples, the message that is sent to the existing participants also includes instructions for the existing participant's client devices 330-350 to generate a new IDR frame based on the benchmark frame.

In addition, the message may include instructions that cause the existing participant's client devices 330-350 to generate the new IDR frame using locally-stored data and the benchmark frame. By using benchmark frames (e.g., instead of IDR frames), the video conference provider 310 may reduce an amount of time that is required to process join requests from new users because existing participant's client devices 330-350 can locally process the smaller benchmark frames quickly. Additionally, since the benchmark frame is derived from a P-frame, which is smaller than a benchmark frame derived from an I-frame, a total amount of network resources and/or bandwidth costs may be reduced. As a result, the reduced bandwidth may also ensure existing participants avoid any adverse bandwidth throttling or metering when using communication network(s) 320.

And while in this example, the video conference provider 310 receives acknowledgements from the existing participants' client device 330-350, as discussed above, the client devices 330-350 themselves may perform such functionality. For example, in a video conference employing end-to-end encryption, where each of the client devices 330-350 encrypts its video and audio streams using cryptographic keys not available to the video conference provider 310, each of the client devices may receive acknowledgements to individual video frames and generate IDR and benchmark frames as discussed above.

Figure 4:
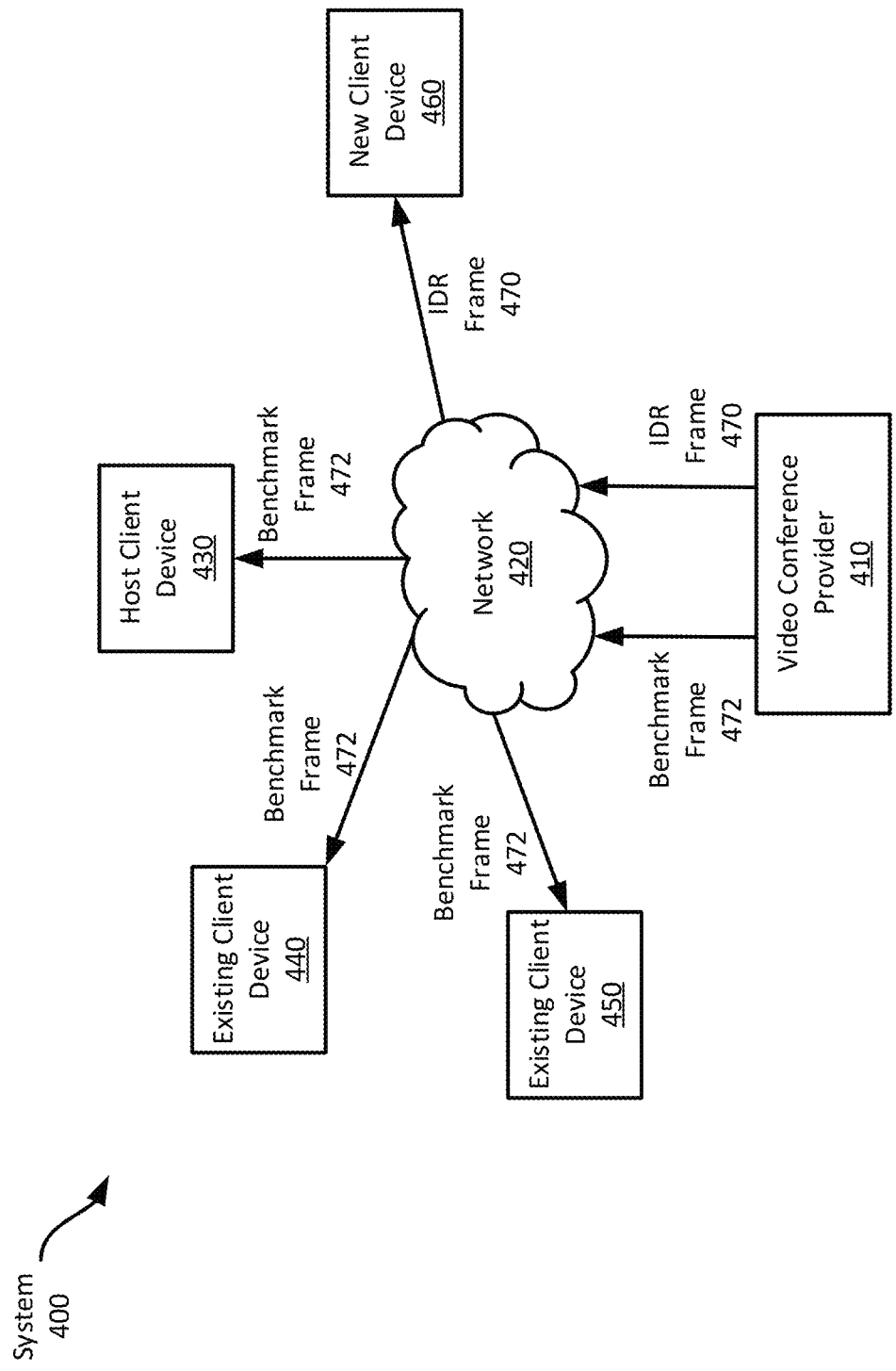

FIG. 4 shows another example system 400 for video frame generation during video conferences. In this example, the host's client device 430 is also connected to two existing client devices 440, 450, a new client device 460, and a video conference provider 410. The client devices 430-460 are connected to video conference provider 410 through one or more communication networks 420, generally as described above with respect to FIGS. 1-3.

In this example, the host client device 430 establishes the meeting, generally, as discussed above with respect to FIG. 3. In addition, the video conference provider 410 receives video frames from the existing participants (e.g., from host client device 430 and existing client devices 440, 450)

during the video conference. And as mentioned above, with respect to the video conference provider 310 of FIG. 3, the video conference provider 410 may use an IDR frame to keep streaming audio and video in lockstep. It should be appreciated that the video conference provider 410 may act as a centralized processing hub or as relay server in different examples. Thus, in some examples, one or more of the client devices 430-460 can perform similar functions as the video conference provider 410 (e.g., in a P2P or end-to-end encryption network environment), including receiving acknowledgements of received video frames and generating IDR frames 470 and benchmark frames 472.

The video conference provider 410 receives a request from a new user, via new client device 460, to join the on-going video conference (e.g., between client devices 430-450). In response to the request from new client device 460, the video conference provider 410 generates an IDR frame 470 for each of the existing participants' video feeds, for example, as described above. Further, the video conference provider 410 transmits these IDR frames 470 to the new client device 460. Using the IDR frames 470, the new client device 460 is able to join the video conference by decoding each of the received full IDR frames 470. However, sending a full video frame to all participants incurs a significant bandwidth cost, particularly if full video frames need to be sent for multiple video feeds to all users.

To avoid this bandwidth cost, the video conference provider 410 also identifies one or more prior video frames that were previously acknowledged by each existing participant's client devices 430-450 for each incoming video feed. The video conference provider 410 generates a benchmark frame 472 for each of the video feeds using at least one of the previously-acknowledged, prior video frames and the IDR frames 470 generated for the new participant. In some examples, the benchmark frame 472 is based on one or more P-frames from among the one or more previously-acknowledge video frames. Further, the benchmark frame 472 may be derived from previously-acknowledged, prior video frames that are obtained from each of the existing participants.

The benchmark frame 472 is used as a delta frame, like a P-frame, to ensure that all existing participants generate a video frame that is identical to the IDR frame sent to the new participant. In addition to the video information, the benchmark frame 472 includes IDR-like instructions to the recipients' decoders to generate a new video frame and to treat that generated video frame as an IDR frame. Thus, all of the existing clients can reset their decoders to use this newly generated frame as the base frame for any subsequent delta frames. Thus, the video conference provider is able to, in effect, send an IDR frame to all existing participants, without incurring the bandwidth cost of transmitting full frames of video to every participant.

In one example, the video conference provider 410 generates the benchmark frame 472 by referencing only data that was previously sent to and acknowledged by all of the existing participants. For instance, the video conference provider 410 may only reference data that is associated with the IDR frame 470 that is based on a previously-acknowledged, prior video frame. In some examples, the benchmark frame 472 may be a single benchmark frame 472 that is duplicated before transmission to each of the existing participants. For instance, the single benchmark frame 472 may be generated based on one or more previously-acknowledged video frames that was received by all of the participants. Further, a single benchmark frame 472 may be used to increase an amount of processing efficiency when synchronizing all existing participants, for example, by generating a single stream for all existing participants instead of multiple, different video streams for each of the existing participants.

In some examples, the benchmark frame 472 includes additional video information that indicates one or more differences between the at least one of the previously-acknowledged, prior video frames and the IDR frame 470. The video conference provider 410 then transmits a message to each of the existing participants that includes the benchmark frame 472. In some examples, the message includes instructions for the client devices 430-450 to generate a new video frame using locally-stored data and the benchmark frame 472. For instance, the instructions may cause the benchmark frame 472 to be treated as an IDR frame would ordinarily be treated.

In one example, the benchmark frame 472 is treated as an IDR frame and is also processed, locally as a P-frame (e.g., by existing participant's client devices 430-450). For instance, the benchmark frame 472 may be synthesized as a P-frame by processing the video frame using interpolative data that ensures temporal, visual integrity for high framerate streaming video. These instructions may cause the benchmark frame 472 to be treated as an IDR frame, for example, based on a characteristic of the benchmark frame 472. In some examples, the client devices 430-450 process the benchmark frame 472 as a typical P-frame would be processed. In additional or alternative examples, the client devices 430-450 may initially process the benchmark frame 472 as a P-frame and wait until a new, successive I-frame is received to generate a new IDR frame.

In one example, the benchmark frame 472 may include a characteristic that is typically associated with an IDR frame, for example, based on a header, syntax, or flag associated with the benchmark frame 472. For instance, using advanced video coding (e.g., the H.264 or MPEG-4 Part 10 standard), the benchmark frame 472 may include a slice header or syntax element that is associated with a typical IDR frame (e.g., "idr_pic_id" or "nal_slice_idr"). In some examples, the benchmark frame 472 may include a flag that is associated with a typical IDR frame (e.g., an "IdrPicFlag" may be present, a "nal_unit_type" may indicate the type of frame is an IDR, or a value of a "redundant_pic_cnt_present_flag" may be set to 0). In additional or alternative examples, the instructions may include information encoded in the benchmark frame 472 that causes the benchmark frame 472 to be treated as an IDR frame. In one example, the benchmark frame 472 is encoded in an IDR format.

Advantageously, the benchmark frame 472 and instructions from the video conference provider 410 may reduce an amount of time that is required to process join requests from new users. Additionally, by using a P-frame as the benchmark frame 472, a total amount of network resources and/or bandwidth costs may be reduced. Further, treating the benchmark frame 472 as an IDR frame ensures a high level of audio and video integrity (e.g., preventing datamoshing effects), while transmitting the benchmark frame 472 as a P-frame requires a minimized amount of downlink bandwidth amongst existing participant's client devices client devices 430-450 (e.g., individually and in the aggregate). Further, such reduced bandwidth may ensure users avoid any adverse bandwidth throttling or metering when using the one or more communication networks 420.

Figure 5:
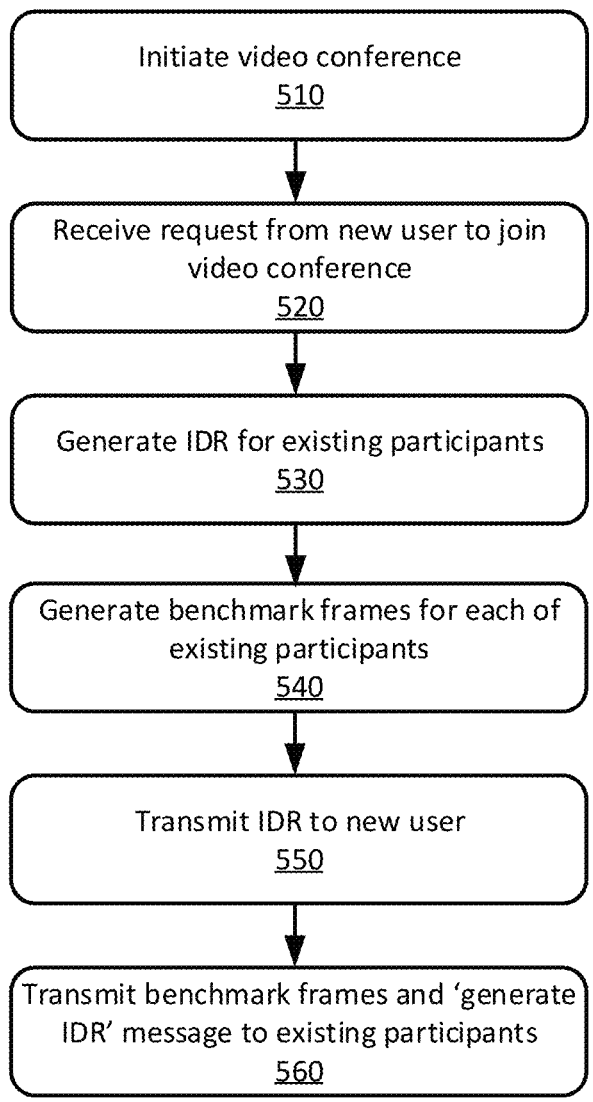
FIG. 5 shows an example method for video frame generation during video conferences.

Referring now to FIG. 5, FIG. 5 shows an example method 500 for video frame generation during video conferences. The method 500 of FIG. 5 will be described with respect to the system shown in FIG. 4; however any suitable system according to this disclosure may be employed, including any of the systems shown in FIGS. 1-3.

At block 510, the video conference provider 410 initiates a video conference. In this example, the video conference is initiated in response to a request received from a host client device 430. However, in some examples, the video conference provider 410 may initiate the video conference without such a request. For example, video conference provider 410 may initiate the video conference at a scheduled meeting time or in response to a request from an existing participant's client device (e.g., existing client device 440) that is not the host.

At block 520, the video conference provider 410 receives a request from a new user to join the video conference. For example, the video conference provider 410 may receive the request from new client device 460. In some examples, such requests may be received while the video conference is on-going. In some examples, such as when the client devices are employing end-to-end encryption of video and audio feeds, and where the video conference provider 410 does not have access to cryptographic keys used to encrypt and decrypt the video and audio streams, the client devices may receive indications that a new participant has joined the video conference. For example, the video conference provider 410 may transmit a notification message to one or more of the participants indicating that the new participant has joined the video conference.

At block 530, the video conference provider 410 generates an IDR frame for each of the existing participants, including the host and the existing participants. For example, the video conference provider 410 uses audio and video data from the host client device 430 and existing client devices 440, 450 the generate the IDR frames (e.g., IDR frames 470). To process the request from block 530, the video conference provider 410 generates an IDR frame 470 for each of the existing participants, for example, as described above with respect to FIG. 4.

At block 540, the video conference provider 410 generates a benchmark frame (e.g., benchmark frame 472) for each of the existing participants' 430-450 video feeds. For example, as discussed above, the video conference provider 410 may identify prior video frames that were previously acknowledged by all of the existing participants' client devices 430-450. The video conference provider 410 generates a benchmark frame 472 for each video feed from the existing participants using at least one of the previously-acknowledged, prior video frames and the corresponding IDR frame 470. In some examples, the benchmark frame 472 may be a new frame type that can be processed based on characteristics and/or features associated with both of an IDR and a P-frame.

The video conference provider 410 may generate the benchmark frame 472 by referencing only data that was previously acknowledged by the existing participants (e.g., using reference data associated with IDR frame 470). In additional or alternative examples, the benchmark frame 472 may be a single benchmark frame 472 that is generated for all of the existing participants. For instance, a single benchmark frame 472 may be generated based on previously-acknowledged video frames that were acknowledged as being received by all of the participants. In some examples, benchmark frame 472 includes additional video information, such as timestamp information or video information that indicates differences between the previously-acknowledged, prior video frames and the IDR frame 470.

For instance, the benchmark frame 472 may be a new type of frame that includes data indicating that the video frame generated from the benchmark frame 472 should be treated as an IDR frame. In additional or alternative examples, the benchmark frame 472 may be a new type of frame that is encoded with information that causes the benchmark frame 472 to be treated as an IDR frame. In one example, the benchmark frame 472 is encoded in an IDR format (e.g., based on an H.264 standard).

At block 550, the video conference provider 410 transmits the IDR frames 470 generated at block 540 to the new client device 460. In this example, the video conference provider 410 sends the IDR frames 470 to the new client device 460 via one or more communication networks 420. Further, the new client device 460 may join the video conference by decoding the full IDR frames 470.

At block 560, the video conference provider 410 transmits the benchmark frame 472 to the existing participants via client devices 430-450. In some examples, the benchmark frame 472 may be a single benchmark frame 472 that is copied and transmitted to each of the existing participant's client devices 430-450. The transmission of the benchmark frame 472 is accompanied by a message to the existing participants to generate an IDR frame from the benchmark frame 472. The video conference provider 410 transmits the message to each of the existing participant's client devices 430-450. For example, the message may include instructions that cause the participant's client devices 430-450 to generate a new IDR frame using locally-stored data and the benchmark frame 472. Further, the instructions may cause the benchmark frame 472 to be treated as an IDR frame would ordinarily be treated.

For example, the message may include instructions that cause the benchmark frame 472 to be treated as an IDR frame that is processed, locally as a P-frame (e.g., by client devices 430-450). The benchmark frame 472 may be treated as an IDR frame based on a characteristic of or information encoded in the benchmark frame 472. For instance, the benchmark frame 472 may be encoded in an IDR format. Further, if additional information is available, such as transition timestamps associated with the video frames (e.g., the benchmark frames 472), the video conference provider 410 may also provide such information in the message. A transition timestamp may be used to mark a time that only references a video frame (e.g., a benchmark frame 472 or IDR frame 470) or successive video frames.

It should be appreciated that the method 500 described above is only one example according to this disclosure. Further, while the video conference provider 410 is described above as a centralized processing hub or relay server, in some examples, one or more client devices 430-460 can perform similar functions as the video conference provider 410 (e.g., using a P2P network architecture). For example, as described above, the video conference provider 410 may not process video frames. Thus, the individual client devices 430-450, after being notified that a new participant has joined the meeting, may instead receive the acknowledgement messages and generate IDR frames 470 and benchmark frames 472 as discussed above, such as with respect to blocks 530-560. Thus, in some examples, example methods according to this disclosure, including method 500, may be performed by one or more client devices rather than the video conference provider. In other examples, the blocks described above may be performed in a different order or one or more blocks may be omitted. For example, the order of blocks 520-570 may occur in any suitable order according to different examples.

Figure 6:
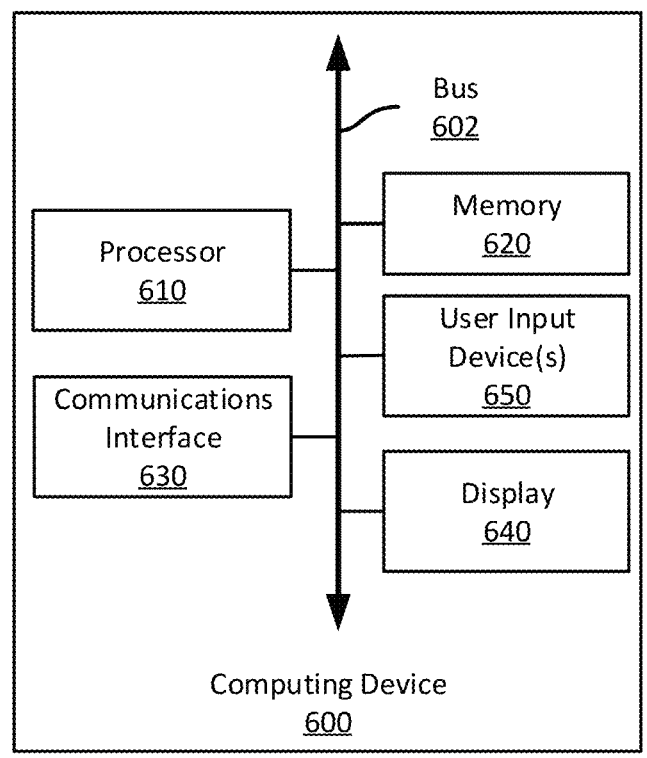
FIG. 6 shows an example computing device suitable for use with any system or method for video frame generation during video conferences according to this disclosure.

Referring now to FIG. 6, FIG. 6 shows an example computing device 600 suitable for use in example systems or methods for suggesting user actions during a video conference according to this disclosure. The example computing device 600 includes a processor 610 which is in communication with the memory 620 and other components of the computing device 600 using one or more communications buses 602. The processor 610 is configured to execute processor-executable instructions stored in the memory 620 to execute an intuitive assistant according to this disclosure or to perform one or more methods for suggesting user actions during a video conference according to different examples, such as part or all of the example method 500 described above with respect to FIG. 5. The computing device, in this example, also includes one or more user input devices 650, such as a keyboard, mouse, touchscreen, video capture device, microphone, etc., to accept user input. The computing device 600 also includes a display 640 to provide visual output to a user.

The computing device 600 also includes a communications interface 630. In some examples, communications interface 630 may enable communications using one or more networks, including a LAN; WAN, such as the Internet; MAN; point-to-point or peer-to-peer connection; etc. Communication with other devices may be accomplished using any suitable networking protocol. For example, one suitable networking protocol may include the IP, TCP, UDP, or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving, during a video conference hosted by a video conferences provider, video streams from a subset of participants of a plurality of participants of the video conference,
   receiving, for each video stream from the subset of the participants, a benchmark video frame;
   generating, for each received benchmark video frame, a new full video frame; and
   establishing a new instantaneous decoder refresh ("IDR") video frame for each new full video frame.

2. The method of claim 1, further comprising receiving instructions to establish the new IDR video frame.

3. The method of claim 1, wherein the benchmark video frame comprises video information indicating differences between one or more acknowledged differential video frames and a prior IDR video frame.

4. The method of claim 1, wherein generating the new full video frame is based on locally-stored data and the benchmark video frame.

5. The method of claim 1, wherein the benchmark video frame is encoded in an IDR format.

6. The method of claim 1, wherein the benchmark video frame is configured to be synthesized locally as a P-frame.

7. The method of claim 1, wherein receiving the video streams comprising receiving one or more differential video frames, each differential video frame based on a prior IDR video frame and zero or more intervening differential video frames.

8. A system comprising:
   a non-transitory computer-readable medium; and
   a processor in communication with the non-transitory computer-readable medium, the processor configured to execute processor-executable instructions stored in the non-transitory computer-readable medium to:

receive, during a video conference hosted by a video conferences provider, video streams from a subset of participants of a plurality of participants of the video conference, receive, for each video stream from the subset of the participants, a benchmark video frame;

generate, for each received benchmark video frame, a new full video frame; and establish a new instantaneous decoder refresh ("IDR") video frame for each new full video frame.

9. The system of claim 8, wherein the processor is configured to execute further processor-executable instructions stored in the non-transitory computer-readable medium to receive instructions to establish the new IDR video frame.

10. The system of claim 8, wherein the benchmark video frame comprises video information indicating differences between one or more acknowledged differential video frames and a prior IDR video frame.

11. The system of claim 8, wherein generating the new full video frame is based on locally-stored data and the benchmark video frame.

12. The system of claim 8, wherein the benchmark video frame is encoded in an IDR format.

13. The system of claim 8, wherein the benchmark video frame is configured to be synthesized locally as a P-frame.

14. The system of claim 8, wherein the processor is configured to execute further processor-executable instructions stored in the non-transitory computer-readable medium to receive instructions to receive one or more differential video frames, each differential video frame based on a prior IDR video frame and zero or more intervening differential video frames.

15. A non-transitory computer-readable medium comprising processor-executable instructions configured to cause a processor to:

receive, during a video conference hosted by a video conferences provider, video streams from a subset of participants of a plurality of participants of the video conference, receive, for each video stream from the subset of the participants, a benchmark video frame;

generate, for each received benchmark video frame, a new full video frame; and establish a new instantaneous decoder refresh ("IDR") video frame for each new full video frame.

16. The non-transitory computer-readable medium of claim 15, further comprising processor-executable instructions configured to cause a processor to establish the new IDR video frame.

17. The non-transitory computer-readable medium of claim 15, wherein the benchmark video frame comprises video information indicating differences between one or more acknowledged differential video frames and a prior IDR video frame.

18. The non-transitory computer-readable medium of claim 15, wherein the benchmark video frame is encoded in an IDR format.

19. The non-transitory computer-readable medium of claim 15, wherein the benchmark video frame is configured to be synthesized locally as a P-frame.

20. The non-transitory computer-readable medium of claim 15, further comprising processor-executable instructions configured to cause a processor to receive instructions to receive one or more differential video frames, each differential video frame based on a prior IDR video frame and zero or more intervening differential video frames.

* * * * *